July 15, 1941.    E. DOZLER    2,249,462
VOLTAGE REGULATING SYSTEM
Filed June 24, 1940
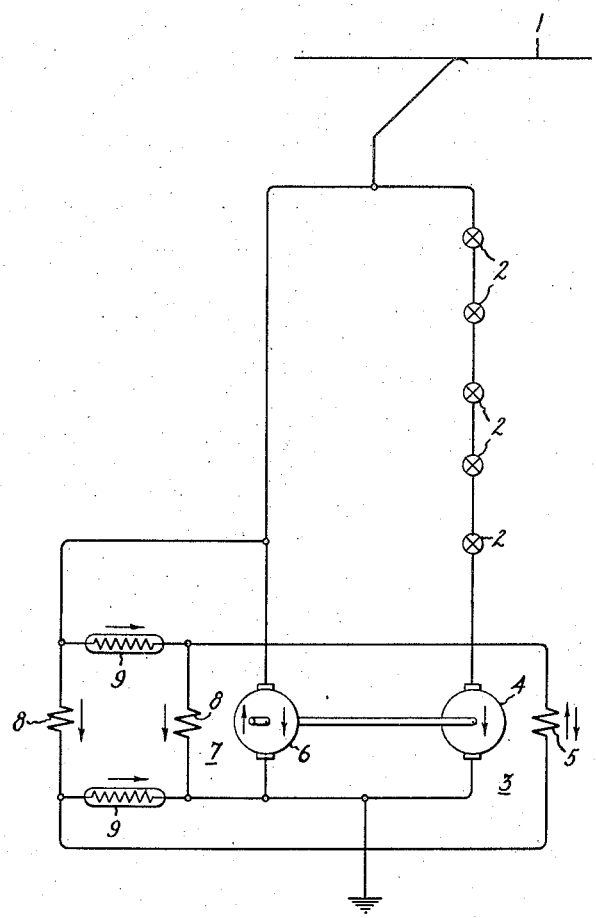
Inventor:
Ernst Dozler,
by Harry E. Dunham
His Attorney.

Patented July 15, 1941

2,249,462

UNITED STATES PATENT OFFICE 2,249,462

VOLTAGE REGULATING SYSTEM

Ernst Dozler, Berlin-Steglitz, Germany, assignor to General Electric Company, a corporation of New York Application June 24, 1940, Serial No. 342,155
In Germany June 17, 1939

5 Claims. (Cl. 171—225)

This invention relates to voltage regulating systems and more particularly to improvements in systems for providing proper voltage for the operation of electric lamps.

Most electric lamps, such as incandescent lamps and fluorescent lamps, operate best at one particular voltage which is determined by the lamp design. Often the source of supply for lamps either has a fairly steady voltage which is below the best lamp voltage or in some cases the source is not only too high or too low but is also fluctuating.

In accordance with this invention there is provided a novel and simple regulating arrangement for automatically supplying lamps or any other suitable load with the correct voltage independently of the voltage of the main source of supply.

An object of the invention is to provide a new and improved regulator system.

Another object of the invention is to provide a novel and simple automatic voltage regulator system for electric lamps.

The invention will be better understood from the following description taken in connection with the accompanying drawing and its scope will be pointed out in the appended claims.

Referring now to the single figure of the accompanying drawing which illustrates diagrammatically an embodiment of the invention, there is shown therein a main supply circuit 1. This supply circuit may be energized by any suitable source, such for example as a direct current generator or a storage battery. It is shown by way of example as having a ground return. Connected across this source of supply is a load consisting of one or more lamps 2 of any well-known type, such, for example, as incandescent lamps or fluorescent lamps. For equalizing any difference between the voltage of the supply circuit 1 and the proper voltage for the lamps 2 is a direct current dynamo-electric machine 3 having an armature 4 connected in series with the lamps and having a field winding 5. The armature 4 is mechanically connected to the armature 6 of a second and similar machine 7. The armature 6 is electrically connected across the source of supply.

Control of the field winding 5 is obtained automatically in response to the voltage of the supply circuit by means of a Wheatstone bridge connection. Two arms of this bridge are a pair of field coils 8 on the machine 7, the other two arms of the bridge being non-linear resistors 9 of any type, such, for example, as iron wire ballast resistors. This bridge circuit has a pair of input terminals connected across the source of supply and has a pair of output terminals connected to energize the field winding 5.

The operation of the invention is as follows. The Wheatstone bridge circuit is so proportioned that when the supply voltage equals the proper load voltage the bridge is balanced and consequently no current flows in the field winding 5, so that the voltage of machine 3 is substantially zero. If now the supply voltage falls below the proper load voltage, the Wheatstone bridge becomes unbalanced in such a direction that the unbalanced current which it then causes to flow through the field winding 5 will excite the machine 3 in such a manner that it produces a voltage in the lamp circuit which boosts the supply voltage by an amount equal to the difference between the supply voltage and the proper load voltage. Machine 3, therefore, acts as a voltage boosting generator and the power required to operate it as a generator is derived from machine 7 which then acts as a motor.

The system will operate in this manner indefinitely so that even if the voltage of the source of supply is permanently lower than the proper load voltage, the regulating system will continuously make up the voltage difference.

If, on the other hand, the supply voltage is higher than the proper load voltage, the Wheatstone bridge will unbalance in the opposite direction thereby reversing the current in the field winding 5. This has the effect of causing machine 3 to operate as a motor for absorbing the voltage difference. The energy of the motor is delivered to machine 7 which then acts as a generator and returns power to the supply circuit.

This regulating arrangement is very efficient as substantially no power is dissipated in regulating resistances and it can be made compact and relatively inexpensive because the rating of the machines 3 and 7 will ordinarily only be a small fraction of the power rating of the load because ordinarily the difference between the supply voltage and the load voltage will not be very great. Furthermore, machines 3 and 7 can be standard direct current dynamos in which the field windings are usually divided into separate coils mounted on different poles so that they are readily adapted for connection into a Wheatstone bridge circuit.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a direct-current load for operation at a predetermined voltage, a direct-current source of supply for said load whose voltage may differ from said predetermined voltage, two means for automatically maintaining the voltage of said load at said predetermined value comprising first and second direct-current commutator type dynamo-electric machines whose armatures are mechanically connected together and electrically connected across said source of supply, said load being connected in series with the armature of said first machine, said first machine having a field winding and said second machine having a pair of field coils, and a pair of non-linear resistors interconnected with said pair of field coils to form a Wheatstone bridge having input terminals connected across said source of supply whereby said second machine is effectively a shunt connected machine whose direction of rotation is fixed, said Wheatstone bridge having output terminals connected across said field winding, said Wheatstone bridge circuit being unbalanced in such a direction when the supply voltage is less than said predetermined load voltage that it causes current to flow in said field winding of such magnitude and such direction as to cause said first machine to operate as a generator driven by said second machine for equalizing the difference between the supply voltage and said predetermined load voltage.

2. In combination, a direct-current load for operation at a predetermined voltage, a direct-current source of supply for said load whose voltage may differ from said predetermined voltage, two means for automatically maintaining the voltage of said load at said predetermined value comprising first and second direct-current commutator type dynamo-electric machines whose armatures are mechanically connected together and electrically connected across said source of supply, said load being connected in series with the armature of said first machine, said first machine having a field winding and said second machine having a pair of field coils, and a pair of non-linear resistors interconnected with said pair of field coils to form a Wheatstone bridge having input terminals connected across said source of supply whereby said second machine is effectively a shunt connected machine whose direction of rotation is fixed, said Wheatstone bridge having output terminals connected across said field winding, said Wheatstone bridge circuit being unbalanced in such a direction when the supply voltage is greater than said predetermined load voltage that it causes current to flow in said field winding of such magnitude and direction as to cause said first machine to operate as a motor which absorbs the difference between the supply voltage and said predetermined load voltage, the power of said first machine being utilized to drive said second machine as a generator for returning power to said source of supply.

3. In combination, a direct-current load for operation at a predetermined voltage, a direct-current source of supply for said load whose voltage may differ from said predetermined voltage, two means for automatically maintaining the voltage of said load at said predetermined value comprising first and second direct-current commutator type dynamo-electric machines whose armatures are mechanically connected together and electrically connected across said source of supply, said load being connected in series with the armature of said first machine, said first machine having a field winding and said second machine having a pair of field coils, and a pair of non-linear resistors interconnected with said pair of field coils to form a Wheatstone bridge having input terminals connected across said source of supply whereby said second machine is effectively a shunt connected machine whose direction of rotation is fixed, said Wheatstone bridge having output terminals connected across said field winding, said Wheatstone bridge circuit being balanced when the supply voltage is equal to said predetermined load voltage whereby no current flows in said field winding, said Wheatstone bridge becoming unbalanced when the supply voltage departs from said predetermined voltage and producing an unbalanced current which flows in said field winding in such direction as to cause said first machine to act as a voltage boosting generator when the supply voltage is less than said predetermined load voltage and to flow in the opposite direction so as to cause said first machine to act as a voltage absorbing motor when said supply voltage exceeds said predetermined load voltage.

4. In a voltage regulator system, in combination, a supply circuit having a variable voltage, a first dynamo-electric machine connected to regulate said voltage, said first dynamo-electric machine having a field winding, a second dynamo-electric machine mechanically connected to said first dynamo-electric machine and electrically connected to be energized by said circuit, said second dynamo-electric machine having a pair of field coils, and a pair of non-linear resistors interconnected with said pair of field coils to form a Wheatstone bridge circuit having input terminals connected to be energized by said supply circuit and having output terminals connected to energize said field winding.

5. In combination, a direct-current source of supply, a load connected across said source of supply, said load having a predetermined normal voltage which differs from the voltage of said source of supply, a voltage regulating generator connected in series with said load producing a voltage which is equal to the difference between said normal load voltage and the voltage of said source of supply, a motor mechanically connected to said generator and electrically connected to be energized by said source of supply, said motor having a field coil, and means controlled by the resistance of said field coil for controlling the energization of the field winding in said generator.

ERNST DOZLER.